US011240313B2

(12) United States Patent
Rakshit et al.

(10) Patent No.: US 11,240,313 B2
(45) Date of Patent: Feb. 1, 2022

(54) CONTEXTUALLY ASSIGNING USER INPUT TO PERSONAL ELECTRONIC DEVICES

(71) Applicant: INTERNATIONAL BUSINESS MACHINES CORPORATION, Armonk, NY (US)

(72) Inventors: Sarbajit K. Rakshit, Kolkata (IN); Martin G. Keen, Cary, NC (US); James E. Bostick, Cedar Park, TX (US); John M. Ganci, Jr., Raleigh, NC (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 41 days.

(21) Appl. No.: 16/210,460

(22) Filed: Dec. 5, 2018

(65) Prior Publication Data

US 2020/0186605 A1 Jun. 11, 2020

(51) Int. Cl.
 *G06F 15/16* (2006.01)
 *H04L 29/08* (2006.01)
 (Continued)

(52) U.S. Cl.
 CPC ............ *H04L 67/125* (2013.01); *G06F 3/017* (2013.01); *G06N 20/00* (2019.01); *G10L 15/22* (2013.01);
 (Continued)

(58) Field of Classification Search
 CPC ... H04L 67/125; H04L 67/1053; H04L 67/22; H04L 67/30; G06N 20/00; G06F 3/017; G06F 3/16; G10L 15/22
 (Continued)

(56) References Cited

U.S. PATENT DOCUMENTS 9,329,773 B2 5/2016 Molander et al.
9,600,169 B2 3/2017 de Sa et al.
(Continued)

OTHER PUBLICATIONS

B. French, D. P. Siewiorek, A. Smailagic and M. Deisher, "Selective Sampling Strategies to Conserve Power in Context Aware Devices," 2007 11th IEEE International Symposium on Wearable Computers, 2007, pp. 77-80.*

(Continued)

*Primary Examiner* — Jeffrey R Swearingen
*Assistant Examiner* — Messeret F Gebre
(74) *Attorney, Agent, or Firm* — Brian M. Restauro, Esq.; Wayne F. Reinke, Esq.; Heslin Rothenberg Farley & Mesiti P.C.

(57) ABSTRACT

Personal electronic devices are organized into a personal electronic device network. One of the personal electronic devices is designated as a device management hub. Based on contextual information from the personal electronic device network, a current activity of a user is predicted, and based on the predicted current user activity and the contextual information, one or more hierarchy is cognitively derived. The device management hub uses one of the hierarchy to contextually assign user input to one of the personal electronic devices for processing. Cognitively predicting the current user activity can include analyzing, by the device management hub, contextual information from the personal electronic devices.

20 Claims, 10 Drawing Sheets

(51) Int. Cl.
*G06N 20/00* (2019.01)
*G06F 3/01* (2006.01)
*G10L 15/22* (2006.01)
*G06F 3/16* (2006.01)

(52) U.S. Cl.
CPC .......... *H04L 67/1053* (2013.01); *H04L 67/22* (2013.01); *H04L 67/30* (2013.01); *G06F 3/16* (2013.01)

(58) Field of Classification Search
USPC .............................................. 709/223, 225
See application file for complete search history.

(56) References Cited

U.S. PATENT DOCUMENTS

| | | | |
|---|---|---|---|
| 9,665,382 | B2 | 5/2017 | Wong |
| 2012/0004782 | A1* | 1/2012 | Koskan ................. H04L 67/303 700/291 |
| 2015/0119726 | A1* | 4/2015 | Matsuno ............... A61B 5/1118 600/483 |
| 2016/0098088 | A1* | 4/2016 | Park ................... G06K 9/00355 345/156 |
| 2016/0165037 | A1* | 6/2016 | Youn ..................... H04W 8/005 455/557 |
| 2017/0154521 | A1* | 6/2017 | Zamorano-Larrate ....... G08B 21/0446 |
| 2017/0181017 | A1* | 6/2017 | Tenny .................. H04W 24/08 |
| 2017/0315938 | A1* | 11/2017 | Mori ...................... G06F 9/445 |
| 2018/0219967 | A1* | 8/2018 | Qian ....................... H04L 41/16 |
| 2018/0332164 | A1* | 11/2018 | Avasthi ................... G06F 3/017 |
| 2020/0082352 | A1* | 3/2020 | Liu ......................... B60L 58/12 |

OTHER PUBLICATIONS

Xulong, Z., Liu, Y., Xuxin, W., & Wusheng, C. (2014). A new redundant-DOF wearable master device with force feedback. Applied Mechanics and Materials, 620, 18-23.*

W. O. L. Vianna and T. Yoneyama, "Predictive Maintenance Optimization for Aircraft Redundant Systems Subjected to Multiple Wear Profiles," in IEEE Systems Journal, vol. 12, No. 2, pp. 1170-1181, Jun. 2018.*

F. Lorussi, W. Rocchia, E. P. Scilingo, A. Tognetti and D. De Rossi, "Wearable, redundant fabric-based sensor arrays for reconstruction of body segment posture," in IEEE Sensors Journal, vol. 4, No. 6, pp. 807-818, Dec. 2004.*

"Method to Expand and Collapse Hierarchical Data Structures," IP.com Prior Art Database Technical Disclosure, IPCOM000237530D, Jun. 20, 2014, 8 pages.

"Method and System for Displaying Hierarchical Path of an Active Item on a Mobile Device," IP.com Prior Art Database Technical Disclosure, IPCOM000216231D, Mar. 26, 2012, 3 pages.

"Navigation Control and Gesture Recognition Input Device for Small, Portable User Interfaces," IP.com Prior Art Database Technical Disclosure, IPCOM000029018D, Jun. 11, 2004, 14 pages.

Rekimoto, Jun, "Gesture Wrist and Gesture Pad: Unobtrusive Wearable Interaction Devices," Interaction Laboratory, Sony Computer Science Laboratories, Inc., Shinagawa-ku, Tokyo, Japan, 2013, 7 pages.

Dannenberg, et al., "A Gesture Based User Interface Prototyping System," School of Computer Science, Carnegie Mellon University, Association for Computing Machinery, ACM 0-89791-335-3/89/0011/0127, 1989, pp. 127-132.

* cited by examiner

CONTEXTUALLY ASSIGNING USER INPUT TO PERSONAL ELECTRONIC DEVICES

BACKGROUND

With the rise in adoption of wearable devices, a single user may be wearing, or in physical possession of, multiple devices at a time. For example, a user may be carrying or wearing any combination of mobile device, smart watch, augmented reality glasses, electronic tattoo, smart textile clothing, smart ring, and so forth.

These devices all contain sensors to monitor the world around them and to detect gestures issued by a user. This can lead to redundant or conflicting responses from each device. For example, when a user issues a trigger word to invoke a digital assistant, all nearby devices utilizing passive listening and responsive to the trigger word will be triggered, hence, being redundant. As another example, when a user is wearing a smart watch and holding a smart phone in the same hand, the gesture of shaking their wrist will be detecting by both devices and result in conflicting actions— the smart phone interprets the movement as "shake to undo previous command" and the smart watch interprets the movement as "turn on the screen."

SUMMARY

Shortcomings of the prior art are overcome and additional advantages are provided through the provision, in one aspect, of a computer-implemented method. The method includes organizing at least two personal electronic devices into a personal electronic device network; designating one of the at least two personal electronic devices as a device management hub; cognitively predicting, based on contextual information from the personal electronic device network, a current activity of a user; cognitively deriving at least one hierarchy of the at least two personal electronic devices based on the current activity of the user and the contextual information; and using, by the device management hub, one of the at least one hierarchy to contextually assign user input to one of the at least two personal electronic devices for processing.

In another aspect, a system for assigning user input to an appropriate personal electronic device may be provided. The system may include, for example, one or more memory, at least one processor in communication with the one or more memory. Further, the system may include program instructions executable by the one or more processor via the memory to perform a method. The method may include, for example: organizing at least two personal electronic devices into a personal electronic device network; designating one of the at least two personal electronic devices as a device management hub; cognitively predicting, based on contextual information from the personal electronic device network, a current activity of a user; cognitively deriving at least one hierarchy of the at least two personal electronic devices based on the current activity of the user and the contextual information; and using, by the device management hub, one of the at least one hierarchy to contextually assign user input to one of the at least two personal electronic devices for processing.

In a further aspect, a computer program product for assigning user input to an appropriate personal electronic device may be provided. The computer program product may include a storage medium readable by a processor and storing instructions for performing a method. The method may include, for example: organizing at least two personal electronic devices into a personal electronic device network; designating one of the at least two personal electronic devices as a device management hub; cognitively predicting, based on contextual information from the personal electronic device network, a current activity of a user; cognitively deriving at least one hierarchy of the at least two personal electronic devices based on the current activity of the user and the contextual information; and using, by the device management hub, one of the at least one hierarchy to contextually assign user input to one of the at least two personal electronic devices for processing.

Further, services relating to one or more aspects are also described and may be claimed herein.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
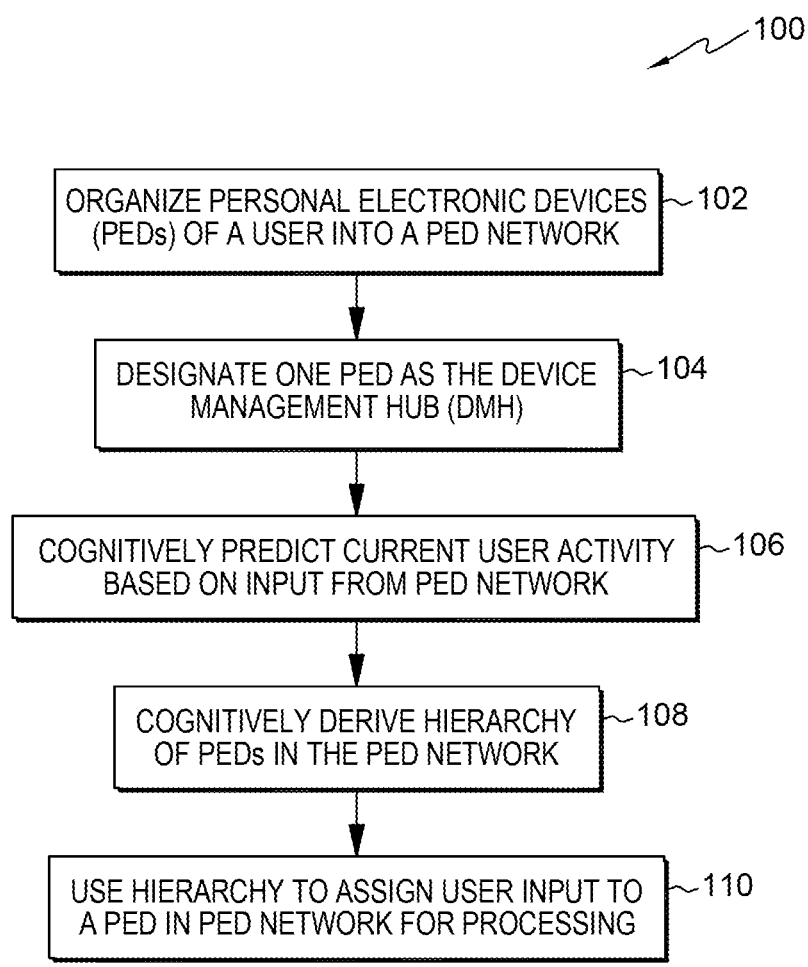
FIG. 1 is a flow diagram for one example of a computer-implemented method of assigning user input to an appropriate personal electronic device for processing, in accordance with one or more aspects of the present disclosure.

One or more aspects of this disclosure relate, in general, to routing of input to one of multiple processors. More particularly, one or more aspects of the present disclosure relates to assigning user input to an appropriate personal electronic device (PED) currently used by the user, based on a hierarchy.

Disclosed herein, in accordance with one or more aspects of the present disclosure, is a method to assign user input, for example, a gesture issued by a user to the appropriate mobile device carried or worn by that user, based on contextual analysis and device hierarchies.

As used herein, the term "Personal Electronic Device" or "PED" refers to an electronic device that is held or worn by a user, for example, a smart phone, a smart watch, augmented reality glasses, etc. Where there is more than one such PED, the PEDs form a PED Network. Thus "PED" also includes personal electronic devices of a user within physical range of a relevant short-range communications protocol, for example, near-field communication (e.g., within a few feet), Bluetooth (e.g., within about 30 feet), Radio Frequency Identification (RFID) and Wi-Fi (e.g., IEEE Protocol 802.11ac or later).

As used herein, the term "Device Management Hub" or "DMH" refers to a PED in a PED Network that manages the other PEDs in the network. In one embodiment, which PED becomes the DMH is predetermined, for example, according to a sensor type applicable to user input (e.g., a microphone for voice input of the user). If the current DMH is turned off or otherwise removed from the PED Network, a new DMH from among the remaining PEDs takes over.

Approximating language that may be used herein throughout the specification and claims, may be applied to modify any quantitative representation that could permissibly vary without resulting in a change in the basic function to which it is related. Accordingly, a value modified by a term or terms, such as "about," is not limited to the precise value specified. In some instances, the approximating language may correspond to the precision of an instrument for measuring the value.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable or suitable. For example, in some circumstances, an event or capacity can be expected, while in other circumstances the event or capacity cannot occur—this distinction is captured by the terms "may" and "may be."

Spatially relative terms, such as "beneath," "below," "lower," "above," "upper," and the like, may be used herein for ease of description to describe one element's or feature's relationship to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" other elements or features would then be oriented "above" or "over" the other elements or features. Thus, the example term "below" may encompass both an orientation of above and below. The device may be otherwise oriented (e.g., rotated 90 degrees or at other orientations) and the spatially relative descriptors used herein should be interpreted accordingly. When the phrase "at least one of" is applied to a list, it is being applied to the entire list, and not to the individual members of the list.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable storage medium(s) having computer readable program code embodied thereon.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

FIG. 1 is a flow diagram 100 for one example of a computer-implemented method of assigning user input to an appropriate personal electronic device, in accordance with one or more aspects of the present disclosure. The method begins with a user having at least two Personal Electronic Devices (PEDs) that are active. The PEDs organize 102 into a PED Network, in which one of the PEDs currently part of the PED Network is designated as the Device Management Hub (DMH). In one embodiment, each PED is aware of a predetermined hierarchy of possible PEDs in a PED Network, which may be, for example, updated from time to time with new types of PEDs that may come into being. In one embodiment, the predetermined hierarchy is, for example, a list of descending computing power. For example, whenever a smart phone is part of the PED Network, it may be predetermined to be the DMH. In another embodiment, when organizing, the PEDs initially communicate and one of the PEDs assumes the DMH role. In any case, once a DMH is designated, it cognitively predicts 106 the user's current activity based on input from the PED Network, including itself. Once a current user activity is cognitively predicted, the DMH cognitively derives 108 a hierarchy of the PEDs currently on the PED Network. In one embodiment, there is a hierarchy for each type of sensor present in the PEDs currently on the PED Network. In one embodiment, each PED shares information regarding which types of sensors they have when initially communicating. In another embodiment, the DMH, once designated, may query all other PEDs in the PED Network as to what type(s) of sensor(s) they have. Once the hierarchy of PEDs present on the PED Network is derived, the DMH proceeds to use the hierarchy to assign user input to a PED in the PED Network for processing. The user input may come from the user, for example, a gesture of the user or a verbal command from the user, or, as another example, may not be directly from the user. For example, there may be a sound external to the user that is intended to trigger some process. As another example, the user input may come from a sensed location or movement of the user (e.g., running or the user exercising on an elliptical machine). As still another example, the user input may include a signal received from a nearby device, for example, a smart lock of the user's vehicle or some other device that is actively looking for a particular connection from the user or PED Network over a wireless communication protocol, e.g., Bluetooth.

Figure 2:
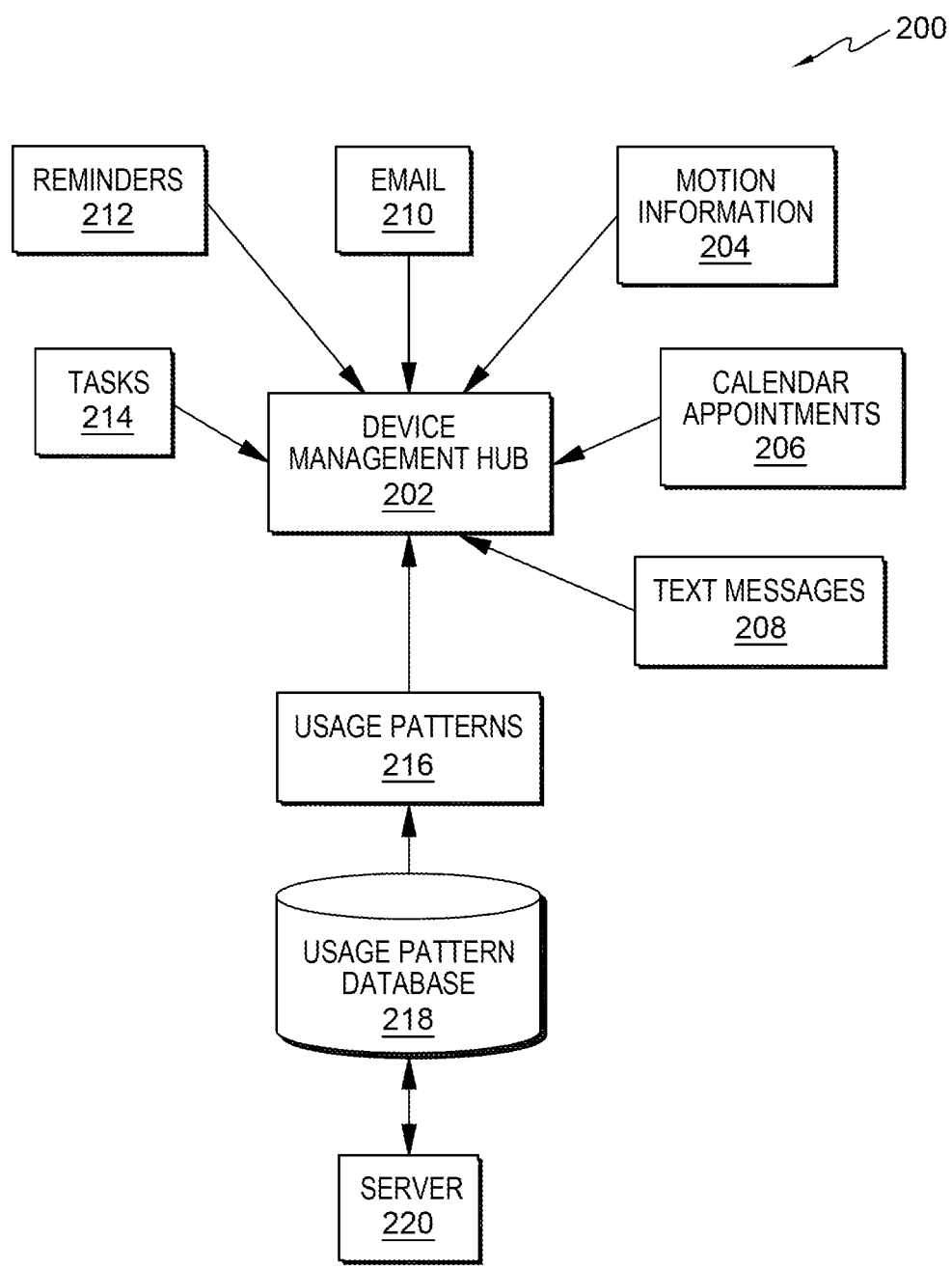
FIG. 2 is a simplified block diagram of one example of a Device Management Hub (DMH) of a Personal Electronic Device (PED) Network (not shown), along with various example types of contextual information that may be used by the DMH to cognitively derive a hierarchy for the PEDs of the PED Network providing the various contextual information, in accordance with one or more aspects of the present disclosure.

FIG. 2 is a simplified block diagram 200 of one example of a Device Management Hub (DMH) 202 of a Personal Electronic Device (PED) Network (not shown), along with various example types of contextual information that may be used by the DMH to cognitively derive a hierarchy for the PEDs of the PED Network providing the various contextual information, in accordance with one or more aspects of the present disclosure. The contextual information may include, for example, information from various sensors included in the PEDs currently on the PED Network. For example, motion information 204 from one or more motion sensors, for example, a gyroscope sensor. The contextual information may also include, for example, indirect information regarding the user, such as, for example, calendar appointments 206, text messages 208, email 210, reminders 212 and tasks 214. In addition, usage patterns 216 of the user may be used by the DMH to infer the current activity of the user. The usage patterns may be current and/or historical for the user and usage patterns for all users in the aggregate. The usage pattern may be stored, for example, in a usage pattern database 218 accessible to the DMH over a network, for example, the Internet, via Wi-Fi, cellular or other wireless medium. Further, a remote server may improve the accuracy of the usage patterns by machine learning with, for example, periodic machine learning updates.

Figure 3:
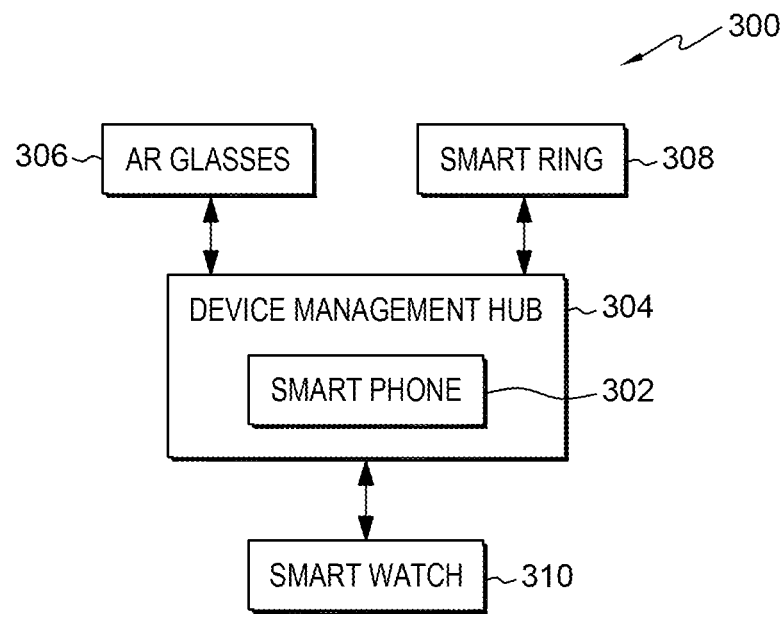
FIG. 3 is a simplified block diagram of one example of a Personal Electronic Device (PED) Network, in accordance with one or more aspects of the present disclosure.

FIG. 3 is a simplified block diagram of one example of a Personal Electronic Device (PED) Network 300, in accordance with one or more aspects of the present disclosure. The PED Network includes, for example, a smart phone 302 that has been designated as the Device Management Hub 304 for the PED Network. In one embodiment, the smart phone is predetermined to be, when present, the Device Management Hub. The user of the PED Network is wearing Augmented Reality (AR) glasses 306, a smart ring 308 and a smart watch 310. When a user input is sensed by the PED Network, the Device Management Hub cognitively predicts a current activity of the user, based on contextual information from the PED Network, including itself. In one embodiment, the Device Management Hub uses a cognitive prediction service, for example, over the Internet, to predict the current activity of the user, forwarding the user input and all contextual information from the PED Network to the service, and receiving back the prediction. In another embodiment, the DMH performs the cognitive prediction. In yet another embodiment, the DMH is associated with a server and the server performs the cognitive prediction. From the user input and the contextual information, a hierarchy for the current PEDs on the PED Network is cognitively derived by, in one embodiment, the Device Management Hub. In another embodiment, the Device Management Hub utilizes a hierarchy derivation service or off loads to an associated server, forwarding the input and contextual information, and receiving back a hierarchy for the current PEDs on the PED Network. Based on the derived hierarchy, either self-derived by the Device Management Hub or received from a service or associated server, the Device Management Hub assigns the user input to a PED on the PED Network. For example, if the user input is a gesture to open a smart door lock, the user input may be sent to the smart ring for processing; in this case, for sending a short-range communication (e.g., NFC) to the door lock to cause it to open.

Figure 4:
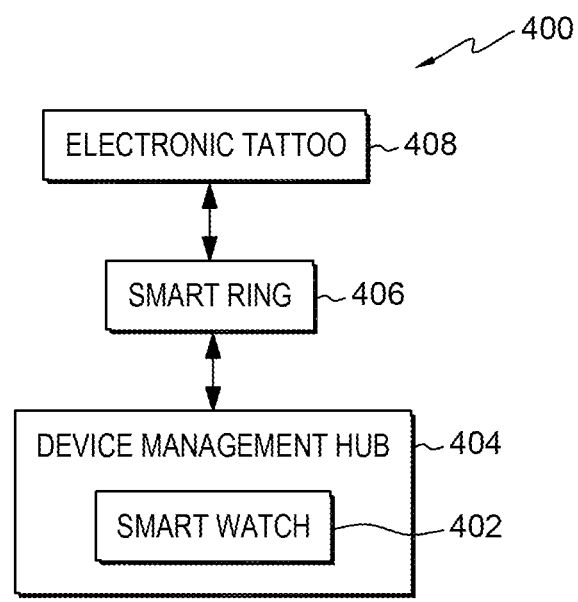
FIG. 4 is a simplified block diagram of another example of a Personal Electronic Device (PED) Network, in accordance with one or more aspects of the present disclosure.

FIG. 4 is a simplified block diagram of another example of a Personal Electronic Device (PED) Network 400, in accordance with one or more aspects of the present disclosure. In this configuration, there is no smart phone, however, a smart watch 402 is present and is designated as the Device Management Hub (DMH) 404 for the PED Network. Also present in the PED Network is a smart ring 406 and an electronic tattoo 408. The smart ring, in this example, acts as an intermediary between the electronic tattoo and the Device Management Hub.

Additional examples of PED Network hierarchies with varying types of PEDs and DMHs are provided in FIGS. 5-10, with each PED in each hierarchy including a particular type of sensor. In one embodiment, the DMH for each of FIGS. 5-10 may be a most complex device of the PED network. In another embodiment, a different device of the PED network is the DMH.

Figure 5:
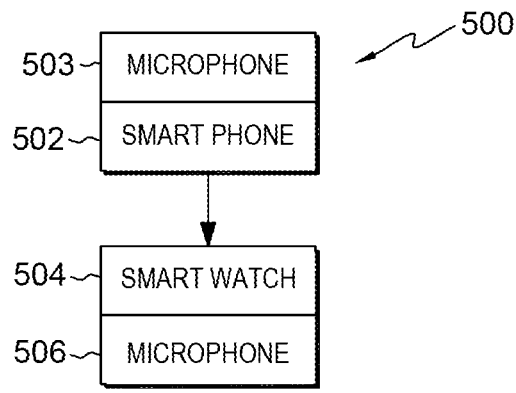
FIG. 5 is a simplified block diagram of one example of a PED Network hierarchy for a microphone, in accordance with one or more aspects of the present disclosure.

FIG. 5 is a simplified block diagram of one example of a PED Network hierarchy 500 for a microphone, in accordance with one or more aspects of the present disclosure. The PED Network hierarchy includes, for example, a smart phone 502 with microphone 503 and a smart watch 504 with microphone 506. The microphone on the smart watch is the first to consider the user input, in this case, sound. If the sound is not determined to be intended to be processed by the smart phone from contextual information, then the smart watch will process the sound. In one example, the microphone is used to listen for a user command or triggering sound more appropriate for the smart watch. For example, a user may state "Show my pictures from yesterday." The user may have an established preference for viewing pictures on the smart phone screen rather than smart watch screen, so the command should be processed by the phone.

Figure 6:
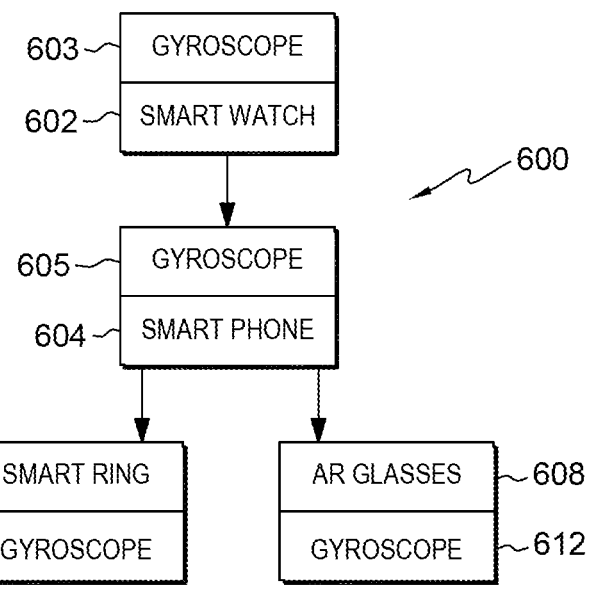
FIG. 6 is a simplified block diagram of one example of a PED Network hierarchy for a gyroscope sensor, in accordance with one or more aspects of the present disclosure.

FIG. 6 is a simplified block diagram of one example of a PED Network hierarchy 600 for a gyroscope sensor, in accordance with one or more aspects of the present disclosure. The PED Network hierarchy includes, for example, a smart watch 602 with gyroscope 603, a smart phone 604 with gyroscope 605, a smart ring 606 and a pair of Augmented Reality (AR) glasses 608. Both the smart ring and AR glasses include a gyroscope (610 and 612, respectively). In the gyroscope hierarchy of FIG. 6, the smart watch is the first in line to process the gyroscope information, if intended for the smart watch, as determined from contextual information. If it was intended that the smart phone process the gyroscope data, then it does so. If the contextual information does not indicate that the data is intended to process the gyroscope data, then it is process by one or both of the smart ring and the AR glasses. For example, a change in direction of the mobile device detected by the gyroscope may indicate a need to change the orientation of a map on the smart watch during navigation, or steering input on a driving game on a mobile device.

Figure 7:
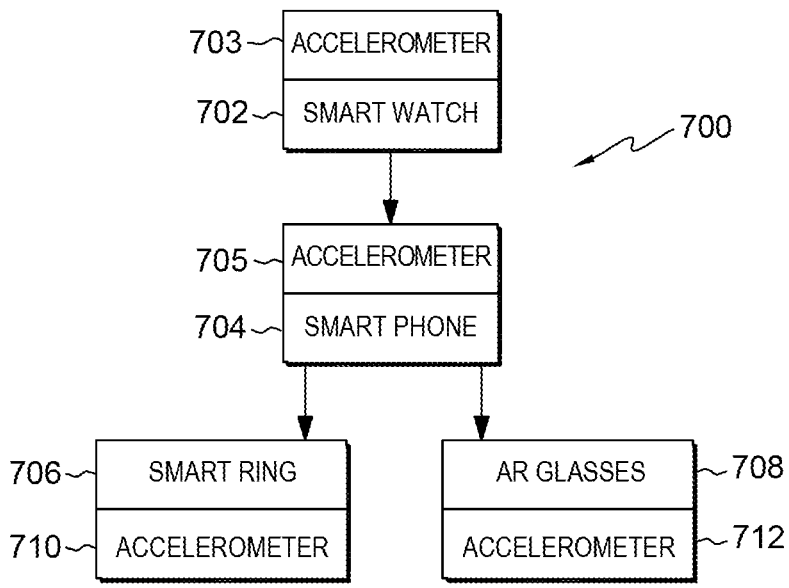
FIG. 7 is a simplified block diagram of one example of a PED Network hierarchy for an accelerometer, in accordance with one or more aspects of the present disclosure.

FIG. 7 is a simplified block diagram of one example of a PED Network hierarchy 700 for an accelerometer, in accordance with one or more aspects of the present disclosure. The PED Network hierarchy includes, for example, a smart watch 702 with accelerometer 703, a smart phone 704 with accelerometer 705, a smart ring 706 and a pair of Augmented Reality (AR) glasses 708, each of the smart ring and AR glasses also including an accelerometer 710 and 712, respectively. The smart watch in FIG. 7 is the first to be considered for processing the user acceleration input. If the acceleration input is not determined to be intended for the smart watch, based on contextual information, then consideration proceeds to the smart phone. If the acceleration input is not determined to be intended for the smart phone, then one or both of the smart ring and the AR glasses process the acceleration input. For example, if shaking is detected, it may relate to "shake to undo" on the mobile device when typing, or exercise (e.g., running) to be measured by smart watch when executing a workout.

Figure 8:
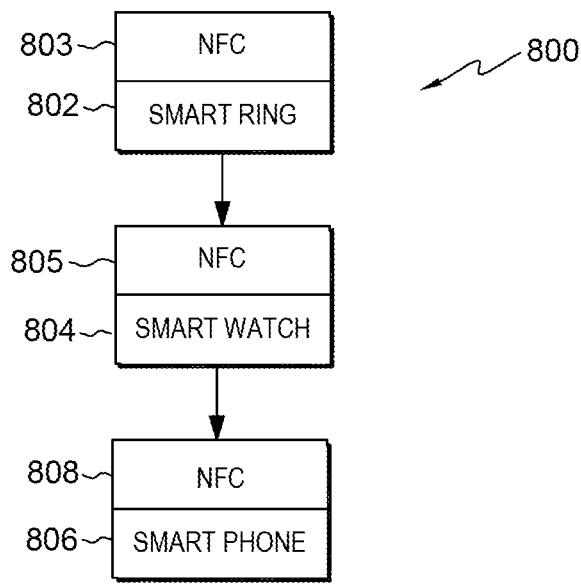
FIG. 8 is a simplified block diagram of one example of a PED Network hierarchy for near-field communication, in accordance with one or more aspects of the present disclosure.

FIG. 8 is a simplified block diagram of one example of a PED Network hierarchy 800 for a near-field communication chip, in accordance with one or more aspects of the present disclosure. The PED Network hierarchy includes, for example, a smart ring 802 with NFC chip 803, a smart watch 804 with NFC chip 805 and a smart phone 806 also having an NFC chip 808. In the example of FIG. 8, the smart ring is first to be considered for processing an incoming NFC signal, based on contextual information. If the NFC signal is determined not to be intended for the smart ring, then the smart watch is next in line for processing the NFC signal, if determined to be intended for the smart watch. Otherwise, the smart phone, being last in the hierarchy for NFC data, will do the processing. In one example, the NFC chip waits for an NFC signal from a nearby device, e.g., a smart lock. The device that contains the digital key to unlock the smart lock is the one that should interact with the NFC signal.

Figure 9:
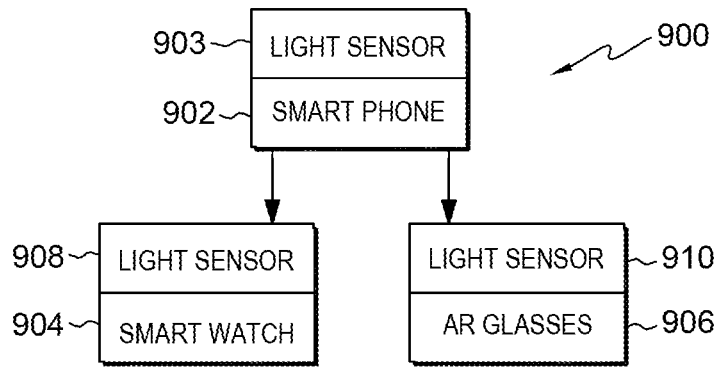
FIG. 9 is a simplified block diagram of one example of a PED Network hierarchy for a light sensor, in accordance with one or more aspects of the present disclosure.

FIG. 9 is a simplified block diagram of one example of a PED Network hierarchy 900 for a light sensor, in accordance with one or more aspects of the present disclosure. The PED Network hierarchy includes, for example, a smart phone 902 with light sensor 903, a smart watch 904 and a pair of AR glasses 906. Each of the smart watch and the pair of AR glasses includes a light sensor (908 and 910, respectively). In the example of FIG. 9, the smart phone is first to be considered for processing sensed light. If it is determined that the light was not intended to be processed by the smart phone, based on contextual information, then the light is processed by the last device(s) in the hierarchy. In this case, the light is processed by one or both of the smart watch and AR glasses. For example, an ambient light sensor may be used to adjust the brightness on the personal electronic device the user is currently using.

Figure 10:
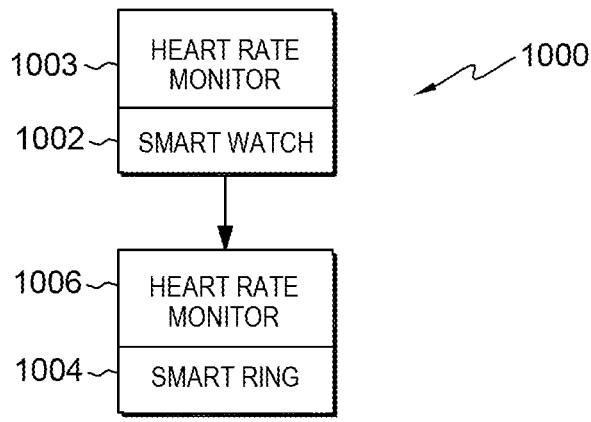
FIG. 10 is a simplified block diagram of one example of a PED Network hierarchy for a heart rate monitor, in accordance with one or more aspects of the present disclosure.

FIG. 10 is a simplified block diagram of one example of a PED Network hierarchy 1000 for a heart rate monitor, in accordance with one or more aspects of the present disclosure. The PED Network hierarchy includes, for example, a smart watch 1002 with heart rate monitor 1003 and a smart ring 1004, the smart ring also including a heart rate monitor 1006. In the example hierarchy of FIG. 10, the smart watch is first to be considered for processing heart rate data. If the heart rate data is not determined to be intended for the smart watch, based on contextual information, then the smart ring processes the heart rate data. In one example, the smart ring periodically checks the user's heart rate and reports it to the smart watch, for example, for use with a health or fitness application.

A user carries or wears multiple mobile devices and wearables on their person. This group of devices is changeable—at one point a user may be in possession of a smart phone, smart watch, and smart ring, and then later may only be wearing a smart watch and smart ring.

The devices are organized into a configuration whereby one device acts as the Device Management Hub and the other devices report directly or indirectly to this hub.

At this point, the Device Management Hub analyzes contextual information to derive where the user is and what they are doing (their current activity).

The system may utilize, for example, one or more of the following contextual services: calendar entry to determine what the user is currently doing, for example, attending a business meeting; analysis of messages exchanged on devices (for example, analyzed by a service); how the user is using each device, for example, which app is running on their smart phone and smart watch and is the user activity using it?; and usage patterns for a given user derived over time, for example, learning that in particular situations a user prefers to interact with one device over another.

The system may also utilize one or more of the following services: Internet of Things Platform—analyzes other nearby IoT devices (not worn by the user) to derive nearby available devices and services; Natural Language Understanding—analysis of electronic communications received on a user's devices to derive context of a current meeting, conversation, or communication; a service to analyze human to machine communications over messaging platforms and email to derive user context; and positioning information of a user based on location services of user's devices to establish where a user is located and the relative position of each device carried by a user.

The Device Management Hub utilizes the contextual data to derive a device hierarchy. This hierarchy describes a prioritized order for which device should analyze given sensor data first.

The device hierarchy may be created for each sensor, for example, specifying for each particular sensor which device should process the sensor input data first. For example, when a user is typing a message on their smart phone, movement detected by an accelerometer likely relates to a gesture for "shake to undo" on the mobile device, rather than to turn on the screen of the smart watch. Therefore smart phone is higher in the accelerometer device hierarchy than smart watch. Conversely, if a user has their smart phone in their pocket and movement is detected by an accelerometer, that movement is more likely to relate to a smart watch gesture, and therefore the smart watch receives accelerometer data higher in the device hierarchy than the smart phone.

The device hierarchy for each sensor is used to derive the meaning of a given gesture or other user input as it relates to a particular device in the hierarchy. In this way, only the device (or devices) that the gesture was intended for will respond. The device hierarchy is, for example, updated continually by the Device Management Hub as contextual factors change.

Figure 15:
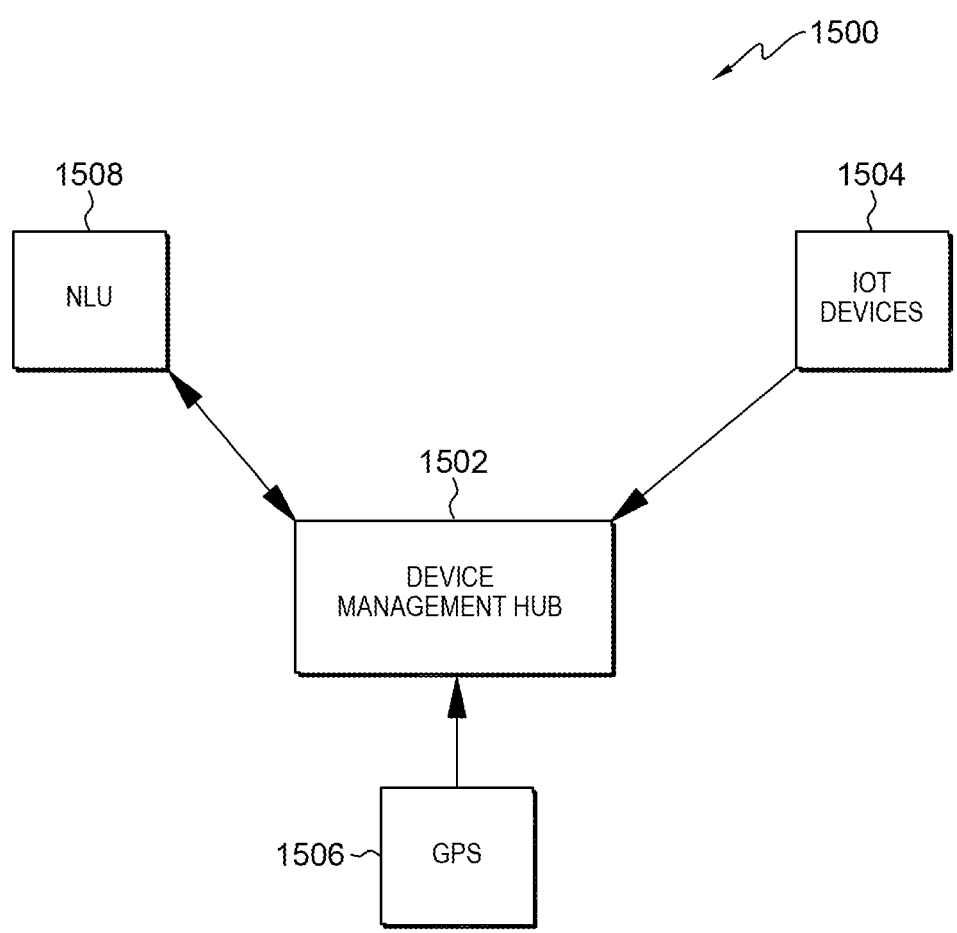
FIG. 15 is a simplified block diagram of one example of a Device Management Hub (DMH) of a Personal Electronic Device (PED) of a PED Network (not shown), along with additional examples of sources of contextual information beyond that of FIG. 2, in accordance with one or more aspects of the present disclosure.

FIG. 15 is a simplified block diagram 1500 of one example of a Device Management Hub (DMH) 1502 of a PED Network (not shown), along with additional examples, beyond that of FIG. 2, of sources of contextual information. Contextual information for determining which PED in the PED Network is to process incoming user input, can be obtained from so-called "IOT" (Internet of Things) devices 1504 and location information from a GPS device 1506. Although not strictly a direct source of contextual information, Natural Language Understanding (NLU) 1508 (e.g., a NLU service) can be used to understand the contextual information described with respect to FIG. 2.

Certain embodiments herein may offer various technical computing advantages involving computing advantages to address problems arising in the realm of computer networks. Particularly, computer networks (in this case, a personal electronic device (PED) network) operating to assign user input to an appropriate PED of the PED Network based on a derived device hierarchy and contextual information. Embodiments herein can include organizing at least two personal electronic devices into a personal electronic device network. Embodiments herein can include designating one of the at least two personal electronic devices as a device management hub. Embodiments herein can include cognitively predicting, based on input from the personal electronic device network, a current activity of a user. Embodiments herein can include cognitively deriving at least one hierarchy of the at least two personal electronic devices based on the current activity of the user. Embodiments herein can include using, by the device management hub, one of the at least one hierarchy to contextually assign user input to one of the at least two personal electronic devices for processing.

Various decision data structures can be used to drive artificial intelligence (AI) decision making, such as a decision data structure that cognitively predicts a current activity of the user of the PED Network, as well as a decision data structure that cognitively derives one or more hierarchy of the PEDs. Further, the hierarchy can be used to contextually assign user input to the PEDs for processing. Decision data structures as set forth herein can be updated by machine learning so that accuracy and reliability is iteratively improved over time without resource consuming rules intensive processing. Machine learning processes can be performed for increased accuracy and for reduction of reliance on rules based criteria and thus reduced computational overhead. For enhancement of computational accuracies, embodiments can feature computational platforms existing only in the realm of computer networks such as artificial intelligence platforms, and machine learning platforms. Embodiments herein can cognitively predict a current activity of a user based on input from a personal electronic device network of the user. Embodiments herein can cognitively derive a hierarchy of personal electronic devices in the PED network. Embodiments herein can employ data structuring processes, e.g. processing for transforming unstructured data into a form optimized for computerized processing. Embodiments herein can examine data from diverse data sources such as data sources that process radio signals for location determination of users. Embodiments herein can include artificial intelligence processing platforms featuring improved processes to transform unstructured data into structured form permitting computer based analytics and decision making. Embodiments herein can include particular arrangements for both collecting rich data into a data repository and additional particular arrangements for updating such data and for use of that data to drive artificial intelligence decision making.

In some instances, contextual information from the PED Network may need to be interpreted. For example, any written and/or spoken language may be interpreted using Natural language understanding. The umbrella term "Natural Language Understanding" can be applied to a diverse set of computer applications, ranging from small, relatively simple tasks such as, for example, short commands issued to robots, to highly complex endeavors such as, for example, the full comprehension of newspaper articles or poetry passages. Many real world applications fall between the two extremes, for example, text classification for the automatic analysis of emails and their routing to a suitable department in a corporation does not require in-depth understanding of the text, but it does need to work with a much larger vocabulary and more diverse syntax than the management of simple queries to database tables with fixed schemata.

Regardless of the approach used, most natural language understanding systems share some common components. The system needs a lexicon of the language and a parser and grammar rules to break sentences into an internal representation. The construction of a rich lexicon with a suitable ontology requires significant effort, for example, the WORDNET lexicon required many person-years of effort. WORDNET is a large lexical database of English. Nouns, verbs, adjectives and adverbs are grouped into sets of cognitive synonyms (synsets), each expressing a distinct concept. Synsets are interlinked by means of conceptual-semantic and lexical relations. The resulting network of meaningfully related words and concepts can be navigated, for example, with a browser specially configured to provide the navigation functionality. WORDNET's structure makes it a useful tool for computational linguistics and natural language processing.

WORDNET superficially resembles a thesaurus, in that it groups words together based on their meanings. However, there are some important distinctions. First, WORDNET interlinks not just word forms—strings of letters—but specific senses of words. As a result, words that are found in close proximity to one another in the network are semantically disambiguated. Second, WORDNET labels the semantic relations among words, whereas the groupings of words in a thesaurus does not follow any explicit pattern other than meaning similarity.

The system also needs a semantic theory to guide the comprehension. The interpretation capabilities of a language understanding system depend on the semantic theory it uses. Competing semantic theories of language have specific trade-offs in their suitability as the basis of computer-automated semantic interpretation. These range from naive semantics or stochastic semantic analysis to the use of pragmatics to derive meaning from context.

Advanced applications of natural language understanding also attempt to incorporate logical inference within their framework. This is generally achieved by mapping the derived meaning into a set of assertions in predicate logic, then using logical deduction to arrive at conclusions. Therefore, systems based on functional languages such as the Lisp programming language need to include a subsystem to represent logical assertions, while logic-oriented systems such as those using the language Prolog, also a programming language, generally rely on an extension of the built-in logical representation framework.

A Natural Language Classifier, which could be a service, for example, applies cognitive computing techniques to return best matching predefined classes for short text inputs, such as a sentence or phrase. It has the ability to classify phrases that are expressed in natural language into categories. Natural Language Classifiers ("NLCs") are based on Natural Language Understanding (NLU) technology (previously known as "Natural Language Processing"). NLU is a field of computer science, artificial intelligence (AI) and computational linguistics concerned with the interactions between computers and human (natural) languages.

For example, consider the following questions: "When can you meet me?" or When are you free?" or "Can you meet me at 2:00 PM?" or "Are you busy this afternoon?" NLC can determine that they are all ways of asking about "setting up an appointment." Short phrases can be found in many different types of messages, and electronic forms. Using, for example, a natural language classifier service API (Application Programming Interface), one can send text from these sources to a natural language classifier trained using machine learning techniques. The classifier will return its prediction of a class that best captures what is being expressed in that text. Based on the predicted class one can trigger an application to take the appropriate action such as providing an answer to a question, suggest a relevant product based on expressed interest or forward the text to an appropriate human expert who can help.

Applications of such APIs include, for example, classifying email as SPAM or No-SPAM based on the subject line and email body; creating question and answer (Q&A) applications for a particular industry or domain; classifying news content following some specific classification such as business, entertainment, politics, sports, and so on; categorizing volumes of written content; categorizing music albums following some criteria such as genre, singer, and so on; combining the natural language classifier service with a conversation service if one wants their application to engage in a conversation with a user; and classifying frequently asked questions (FAQs).

In one example, a cognitive computer system performs an analysis of contextual information. In general, the term "cognitive computing" (CC) has been used to refer to new hardware and/or software that mimics the functioning of the human brain and helps to improve human decision-making, which can be further improved using machine learning. In this sense, CC is a new type of computing with the goal of more accurate models of how the human brain/mind senses, reasons, and responds to stimulus. CC applications link data analysis and adaptive page displays (AUI) to adjust content for a particular type of audience. As such, CC hardware and applications strive to be more effective and more influential by design.

Some common features that cognitive systems may express include, for example: ADAPTIVE—they may learn as information changes, and as goals and requirements evolve. They may resolve ambiguity and tolerate unpredictability. They may be engineered to feed on dynamic data in real time, or near real time; INTERACTIVE—they may interact easily with users so that those users can define their needs comfortably. They may also interact with other processors, devices, and Cloud services, as well as with people; ITERATIVE AND STATEFUL—they may aid in defining a problem by asking questions or finding additional source input if a problem statement is ambiguous or incomplete. They may "remember" previous interactions in a process and return information that is suitable for the specific application at that point in time; and CONTEXTUAL—they may understand, identify, and extract contextual elements such as meaning, syntax, time, location, appropriate domain, regulations, user's profile, process, task and goal. They may draw on multiple sources of information, including both structured and unstructured digital information, as well as sensory inputs (e.g., visual, gestural, auditory and/or sensor-provided).

Figure 11:
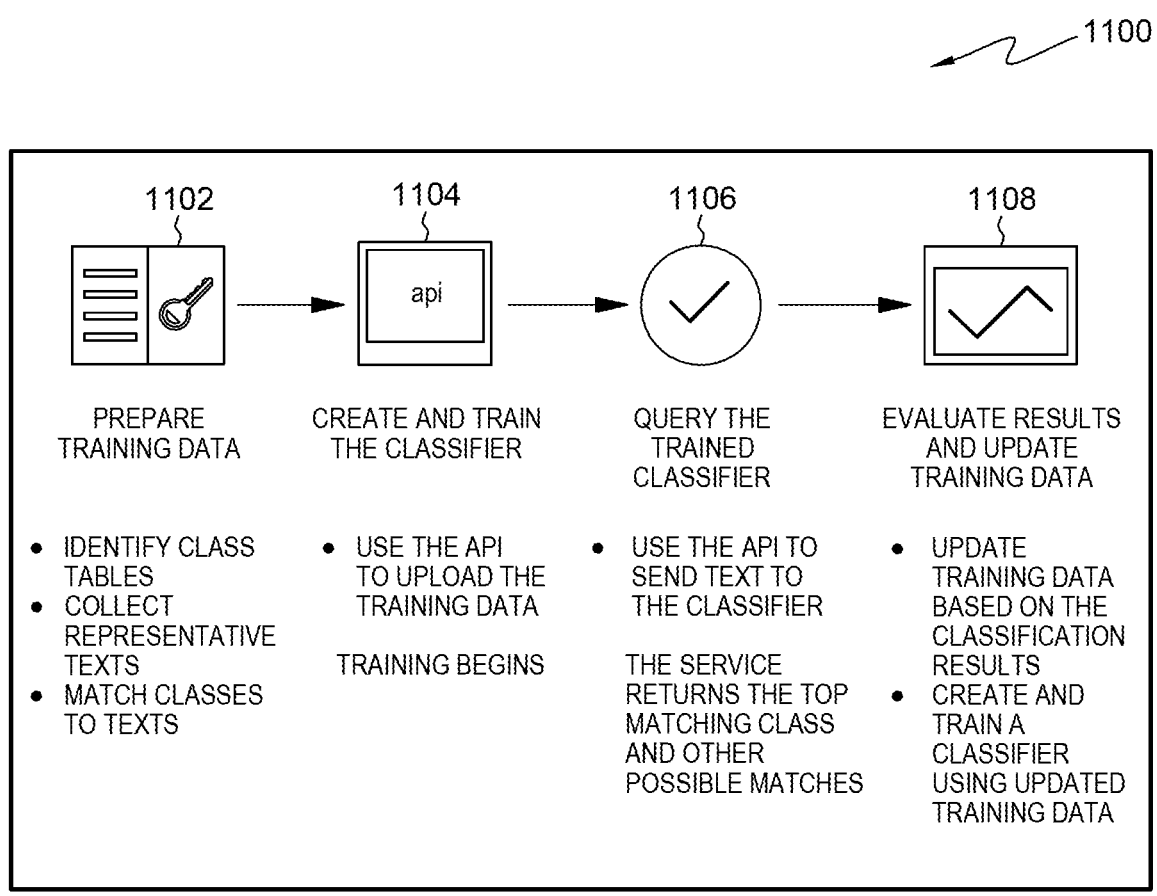
FIG. 11 is a flow diagram of one example of implementing a Natural Language Classifier, in accordance with one or more aspects of the present disclosure.

FIG. 11 is a hybrid flow diagram 1100 of one example of an overview of the basic steps for creating and using a natural language classifier service. Initially, training data for machine learning is prepared, 1102, by identifying class tables, collecting representative texts and matching the classes to the representative texts. An API (Application Planning Interface) may then be used to create and train the classifier 1104 by, for example, using the API to upload training data. Training may begin at this point. After training, queries can be made to the trained natural language classifier, 1106. For example, the API may be used to send text to the classifier. The classifier service then returns the matching class, along with other possible matches. The results may then be evaluated and the training data updated, 1108, for example, by updating the training data based on the classification results. Another classifier can then be trained using the updated training data.

In addition, providing the cognitive predictions may include searching cross co-occurrence matrices in making the cognitive predictions. Based, at least in part, on the user input in context, an activity of the user may be predicted in real-time. The cognitive predictions may be continually or periodically updated. The predicting and providing the cognitive predictions are performed by one or more processor, in communication with one or more memory storing instructions for the processor(s) to carry out the predicting and providing of cognitive predictions of user activity to the device management hub.

Various decision data structures can be used to drive artificial intelligence (AI) decision making, such as decision data structure that cognitively maps social media interactions in relation to posted content in respect to parameters for use in better allocations that can include allocations of digital rights. Decision data structures as set forth herein can be updated by machine learning so that accuracy and reliability is iteratively improved over time without resource consuming rules intensive processing. Machine learning processes can be performed for increased accuracy and for reduction of reliance on rules based criteria and thus reduced computational overhead.

For enhancement of computational accuracies, embodiments can feature computational platforms existing only in the realm of computer networks such as artificial intelligence platforms, and machine learning platforms. Embodiments herein can employ data structuring processes, e.g. processing for transforming unstructured data into a form optimized for computerized processing. Embodiments herein can examine data from diverse data sources such as data sources that process radio or other signals for location determination of users. Embodiments herein can include artificial intelligence processing platforms featuring improved processes to transform unstructured data into structured form permitting computer based analytics and decision making. Embodiments herein can include particular arrangements for both collecting rich data into a data repository and additional particular arrangements for updating such data and for use of that data to drive artificial intelligence decision making.

As used herein, the terms "cognitively predicting" and cognitively deriving" refer to the use of cognitive computing in making user activity predictions and deriving PED hierarchies to the DMH in real-time. Cognitive computing is the simulation of human thinking, using software and/or hardware, which may be enhanced/improved using machine learning. Machine learning is based in mathematics and statistical techniques, giving computer systems the ability to "learn" with data provided, e.g., a relatively large amount of data, without the need to be explicitly programmed. The goal of cognitive computing is to create automated systems capable of solving problems without human assistance, broadly referred to as Artificial Intelligence (AI).

Artificial intelligence (AI) refers to intelligence exhibited by machines. Artificial intelligence (AI) research includes search and mathematical optimization, neural networks and probability. Artificial intelligence (AI) solutions involve features derived from research in a variety of different science and technology disciplines ranging from computer science, mathematics, psychology, linguistics, statistics, and neuroscience.

As used herein, the term "real-time" refers to a period of time necessary for data processing and presentation to a user to take place, and which is fast enough that a user does not perceive any significant delay. Thus, "real-time" is from the perspective of the user.

In one embodiment, a number of instances of such a decision data structure may be active, each instance for a different user. Such a machine learning process can continually or periodically update the relevant factors of the different instances of the decision data structure.

An NLU process to process data for preparation of records that are stored in a data repository and for other purposes. In one example, can run a Natural Language Understanding (NLU) process for determining one or more NLU output parameter of a text, for example. Such an NLU process can include one or more of a topic classification process that determines topics of text and output one or more topic NLU output parameter. Running such an NLU process allows to perform a number of processes.

In a first aspect, disclosed above is a computer-implemented method. The computer-implemented method includes: organizing personal electronic devices into a personal electronic device network; designating one of the personal electronic devices as a device management hub; cognitively predicting, based on contextual information from the personal electronic device network, a current activity of a user; cognitively deriving one or more hierarchy of the at least two personal electronic devices based on the current activity of the user and the contextual information; and using, by the device management hub, one of the hierarchy(ies) to contextually assign user input to one of the at least two personal electronic devices for processing.

In one example, the device management hub may be, for example, predetermined.

In one example, the cognitively predicting in the computer-implemented method of the first aspect may include, for example, analyzing, by the device management hub, contextual information from the personal electronic devices. In one example, the contextual information may include, for example, one or more of motion information, calendar information, messages, email, reminders, tasks, current activity and usage patterns of the user. In one example, the usage patterns may be, for example, improved via machine learning of historical usage pattern data for the user.

In one example, the hierarchy or hierarchies in the computer-implemented method of the first aspect may include, for example, multiple hierarchies, and each hierarchy of the hierarchies is sensor specific.

In one example, the one of the one or more hierarchy in the computer-implemented method of the first aspect may, for example, determine which of the personal electronic devices processes user input for a particular type of sensor. In one example, the input may include, for example, at least one of a gesture of the user, a sound and a voice of the user.

In one example, the at least one of the cognitively predicting and the cognitively deriving in the computer-implemented method of the first aspect may be, for example, performed for the device management hub by one or more cognitive service.

In one example, the organizing in the computer-implemented method of the first aspect may be, for example, automatic.

In a second aspect, disclosed above is a system. The system includes: one or more memory; and processor(s) in communication with the memory, the memory storing program code to perform a method, the method including: organizing personal electronic devices into a personal electronic device network; designating one of the personal electronic devices as a device management hub; cognitively predicting, based on contextual information from the personal electronic device network, a current activity of a user; cognitively deriving one or more hierarchy of the at least two personal electronic devices based on the current activity of the user and the contextual information; and using, by the device management hub, one of the hierarchy(ies) to contextually assign user input to one of the at least two personal electronic devices for processing.

In one example, the cognitively predicting in the method of the system of the second aspect may include, for example, analyzing, by the device management hub, contextual information from the personal electronic devices. In one example, the contextual information may include, for example, one or more of motion information, calendar information, messages, email, reminders, tasks, current activity and usage patterns of the user. In one example, the usage patterns may be, for example, improved via machine learning of historical usage pattern data for the user.

In one example, at least one of the cognitively predicting and the cognitively deriving in the method of the system of the second aspect may be, for example, performed for the device management hub by one or more cognitive service.

In a third aspect, disclosed above is a computer program product. The computer program product includes a storage medium readable by a processor and storing instructions for performing a method, the method including: organizing personal electronic devices into a personal electronic device network; designating one of the personal electronic devices as a device management hub; cognitively predicting, based on contextual information from the personal electronic device network, a current activity of a user; cognitively deriving one or more hierarchy of the at least two personal electronic devices based on the current activity of the user and the contextual information; and using, by the device management hub, one of the hierarchy(ies) to contextually assign user input to one of the at least two personal electronic devices for processing.

In one example, the cognitively predicting may include, for example, analyzing, by the device management hub, contextual information from the personal electronic devices. In one example, the contextual information may include, for example, one or more of motion information, calendar information, messages, email, reminders, tasks, current activity and usage patterns of the user. In one example, the usage patterns may be, for example, improved via machine learning of historical usage pattern data for the user.

In one example, at least one of the cognitively predicting and the cognitively deriving in the method of the computer program product of the third aspect may be, for example, performed for the device management hub by one or more cognitive service.

Figure 12:
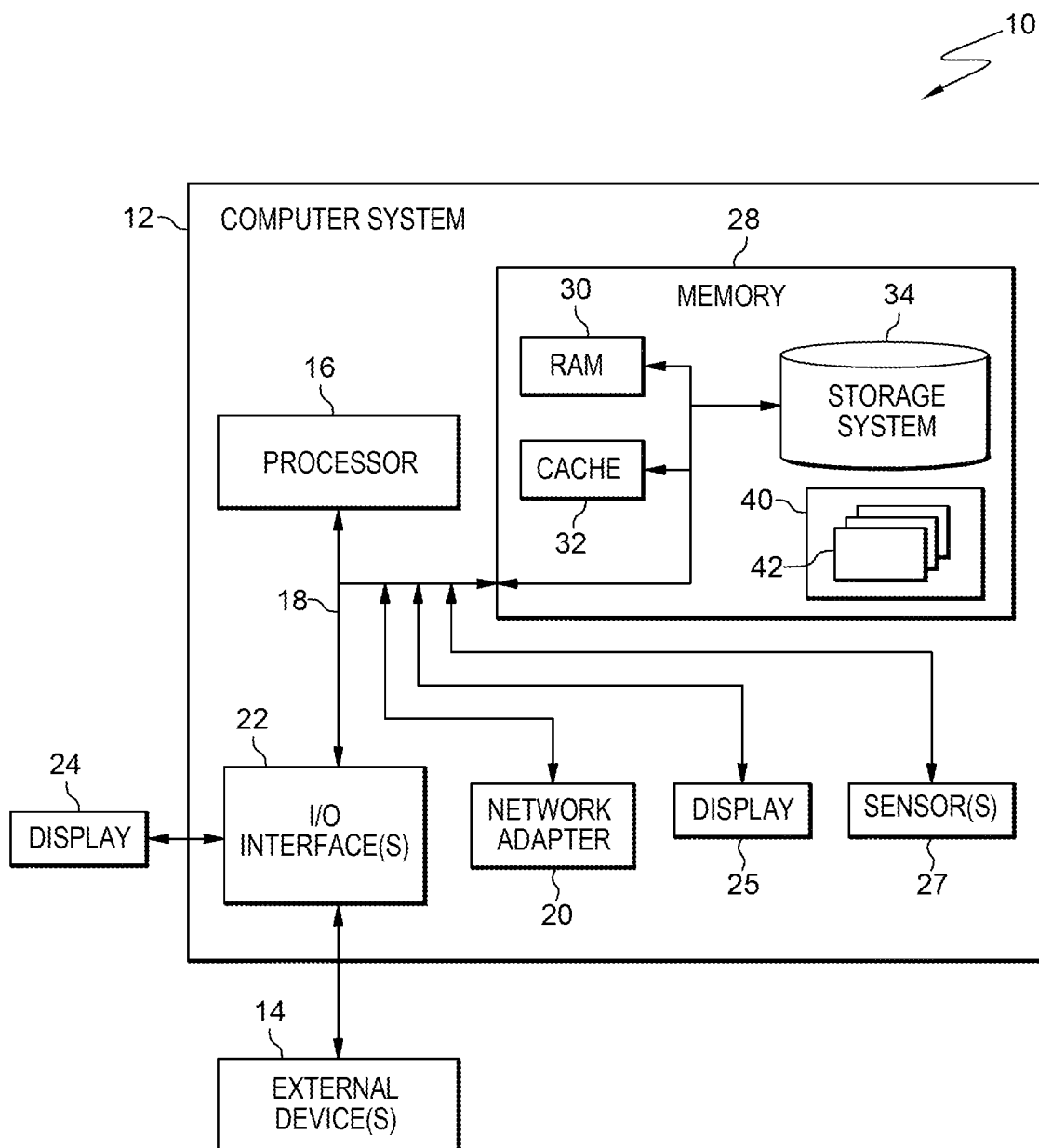
FIG. 12 is a block diagram of one example of a computer system, in accordance with one or more aspects of the present disclosure.
Figure 13:
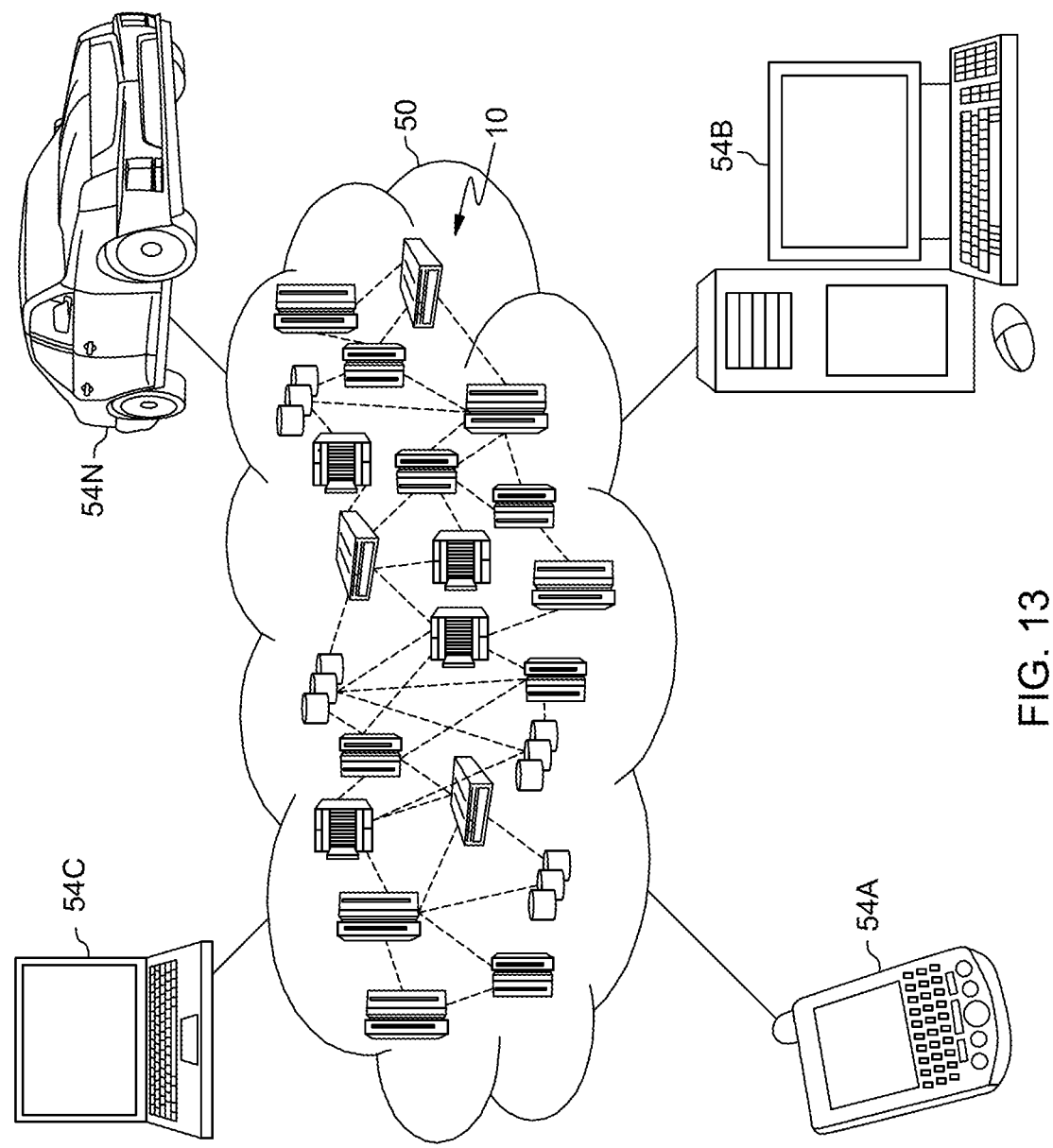
FIG. 13 is a block diagram of one example of a cloud computing environment, in accordance with one or more aspects of the present disclosure.
Figure 14:
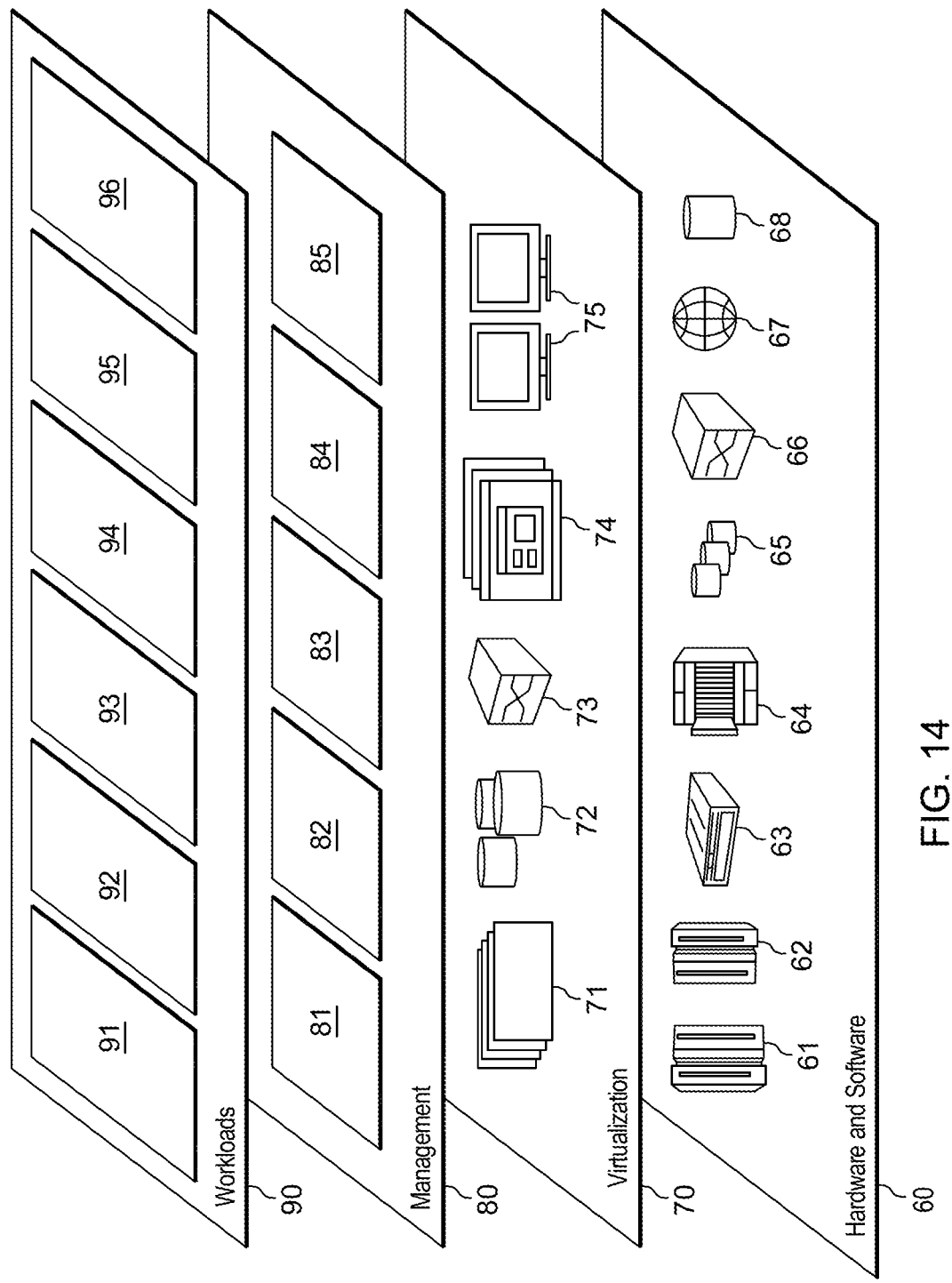
FIG. 14 is a block diagram of one example of functional abstraction layers of the cloud computing environment of FIG. 13, in accordance with one or more aspects of the present disclosure.

FIGS. 12-14 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 12, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 12, computer system 12 in computing node 10 is shown in the form of a computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 13-14.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. One or more program 40 including program processes 42 can define machine logic to carry out the functions set forth herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include, for example, a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 13 computing node 10 is described as being implemented in a cloud computing environment and accordingly is referred to as a cloud computing node in the context of FIG. 13.

Referring now to FIG. 13, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 13 are intended to be illustrative only and that computing nodes 10 and cloud computing environment 50 can communicate with any type of computerized device over any type of network and/or network addressable connection (e.g., using a web browser).

Referring now to FIG. 14, a set of functional abstraction layers provided by cloud computing environment 50 (FIG. 13) is shown. It should be understood in advance that the components, layers, and functions shown in FIG. 14 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for establishing and updating geofence locations as set forth herein. The processing components 96 can be implemented with use of one or more program 40 described in FIG. 12.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer-implemented method, comprising:
   organizing at least two personal electronic devices of a user into a personal electronic device network local to the user;
   designating one of the at least two personal electronic devices as a device management hub, wherein all sensors and their respective personal electronic device become known to the device management hub and all other of the at least two personal electronic devices;
   cognitively predicting, based on contextual information from the personal electronic device network, a current activity of the user;
   cognitively deriving at least one sensor-specific hierarchy of the at least two personal electronic devices based on the current activity of the user and the contextual information;
   using, by the device management hub, one of the at least one sensor-specific hierarchy to contextually assign user input to one of the at least two personal electronic devices for processing; and
   wherein an only network necessary to perform the computer-implemented method is the personal electronic device network.

2. The computer-implemented method of claim 1, wherein the device management hub is predetermined.

3. The computer-implemented method of claim 1, wherein the cognitively predicting comprises analyzing, by the device management hub, contextual information from the at least two personal electronic devices.

4. The computer-implemented method of claim 3, wherein the contextual information comprises one or more of motion information, calendar information, messages, email, reminders, tasks, current activity and usage patterns of the user.

5. The computer-implemented method of claim 4, wherein the usage patterns are improved via machine learning of historical usage pattern data for the user.

6. The computer-implemented method of claim 1, wherein the hierarchy comprises a plurality of hierarchies.

7. The computer-implemented method of claim 1, wherein the one of the at least one hierarchy determines which of the at least two personal electronic devices processes user input on a particular type of sensor.

8. The computer-implemented method of claim 7, wherein the input comprises at least one of a gesture of the user, a sound and a voice of the user.

9. The computer-implemented method of claim 1, wherein at least one of the cognitively predicting and the cognitively deriving are performed for the device management hub by one or more cognitive service.

10. The computer-implemented method of claim 1, wherein the organizing is automatic.

11. A system, comprising:

a memory; and at least one processor in communication with the memory, the memory storing program code to perform a method, the method comprising:

organizing at least two personal electronic devices of a user into a personal electronic device network local to the user;

designating one of the at least two personal electronic devices as a device management hub, wherein all sensors and their respective personal electronic device become known to the device management hub and all other of the at least two personal electronic devices;

cognitively predicting, based on contextual information from the personal electronic device network, a current activity of the user;

cognitively deriving at least one sensor-specific hierarchy of the at least two personal electronic devices based on the current activity of the user and the contextual information;

using, by the device management hub, one of the at least one sensor-specific hierarchy to contextually assign user input to one of the at least two personal electronic devices for processing; and wherein an only network necessary to perform the computer-implemented method is the personal electronic device network.

12. The system of claim 11, wherein the cognitively predicting comprises analyzing, by the device management hub, contextual information from the at least two personal electronic devices.

13. The system of claim 12, wherein the contextual information comprises one or more of motion information, calendar information, messages, email, reminders, tasks, current activity and usage patterns of the user.

14. The system of claim 13, wherein the usage patterns are improved via machine learning of historical usage pattern data for the user.

15. The system of claim 11, wherein at least one of the cognitively predicting and the cognitively deriving are performed for the device management hub by one or more cognitive service.

16. A computer program product, comprising:

instructions stored in a computer-readable storage medium, the instructions being readable and executable by a processor for performing a method, the method comprising:

organizing at least two personal electronic devices of a user into a personal electronic device network local to the user;

designating one of the at least two personal electronic devices as a device management hub, wherein all sensors and their respective personal electronic device become known to the device management hub and all other of the at least two personal electronic devices;

cognitively predicting, based on contextual information from the personal electronic device network, a current activity of the user;

cognitively deriving at least one sensor-specific hierarchy of the at least two personal electronic devices based on the current activity of the user and the contextual information;

using, by the device management hub, one of the at least one sensor-specific hierarchy to contextually assign user input to one of the at least two personal electronic devices for processing; and wherein an only network necessary to perform the computer-implemented method is the personal electronic device network.

17. The computer program product of claim 16, wherein the cognitively predicting comprises analyzing, by the device management hub, contextual information from the at least two personal electronic devices.

18. The computer program product of claim 17, wherein the contextual information comprises one or more of motion information, calendar information, messages, email, reminders, tasks, current activity and usage patterns of the user.

19. The computer program product of claim 18, wherein the usage patterns are improved via machine learning of historical usage pattern data for the user.

20. The computer program product of claim 16, wherein at least one of the cognitively predicting and the cognitively deriving are performed for the device management hub by one or more cognitive service.

* * * * *